US006640662B1

(12) United States Patent
Baxter

(10) Patent No.: US 6,640,662 B1
(45) Date of Patent: Nov. 4, 2003

(54) VARIABLE LENGTH CRANK ARM ASSEMBLY

(76) Inventor: Craig Baxter, 65 Terry Ter. #4A, Carrollton, GA (US) 30117

( * ) Notice: Subject to any disclaimer, the term of this patent is extended or adjusted under 35 U.S.C. 154(b) by 0 days.

(21) Appl. No.: 10/144,141

(22) Filed: May 9, 2002

(51) Int. Cl.[7] .................................................. G05G 1/16
(52) U.S. Cl. ...................... 74/594.3; 74/594.1; 280/259
(58) Field of Search .................................. 280/256–262; 74/594.1–594.4, 560, 562

(56) References Cited

U.S. PATENT DOCUMENTS

| 4,519,271 | A | | 5/1985 | Chattin ...................... 74/594.3 |
| 4,560,182 | A | * | 12/1985 | Yamaguchi ................. 280/257 |
| 4,807,491 | A | | 2/1989 | Stuckenbrok .............. 74/594.1 |
| 4,960,013 | A | | 10/1990 | Sander ....................... 74/594.3 |
| 5,161,430 | A | * | 11/1992 | Febey ........................ 74/594.7 |
| 5,207,119 | A | * | 5/1993 | Garneau ..................... 74/594.3 |
| 5,261,294 | A | | 11/1993 | Ticer et al. ................. 74/594.1 |
| 5,442,972 | A | * | 8/1995 | Hoover ........................... 74/65 |
| 5,566,590 | A | * | 10/1996 | Wan .......................... 74/594.3 |
| 5,833,257 | A | * | 11/1998 | Kohlheb et al. ............ 280/251 |
| 5,879,017 | A | * | 3/1999 | Debruin ...................... 280/259 |
| 6,152,471 | A | | 11/2000 | Kang et al. ................. 280/261 |
| 6,253,639 | B1 | * | 7/2001 | Richardson ................ 74/594.3 |
| 6,276,234 | B1 | | 8/2001 | Harrington ................. 74/594.3 |
| 6,474,193 | B1 | * | 11/2002 | Farney ....................... 74/594.3 |

* cited by examiner

Primary Examiner—Lesley D. Morris
Assistant Examiner—L. Lum
(74) Attorney, Agent, or Firm—Baker Donelson

(57) ABSTRACT

A variable length crank arm assembly (10) is disclosed which is mounted to a bicycle (11). The crank arm assembly (10) has a pair of oppositely disposed crank arms (25) each having a boss (26) from which extends a forked, crank arm member (27). Each crank arm member (27) has a first portion (28) that extends to a second portion (29). The second portion (29) has a proximal stop (31) and a distal stop plate (32). The crank arm assembly (10) also includes a slide (34) slideably mounted upon the second portion (29). A pair of proximal springs (37) are mounted upon the arm member second portion (29) which bias the slide (34) toward distal stop plate (32). A pair of distal springs (38) are mounted upon the second portion (29) which bias the slide (34) toward the proximal stops (31). A pedal assembly (41) is rotatably mounted to the slide (34). The pedal assembly (41) includes a shaft (42) extending from slide (34) and a conventional pedal (43) rotatably mounted to shaft (42).

6 Claims, 2 Drawing Sheets

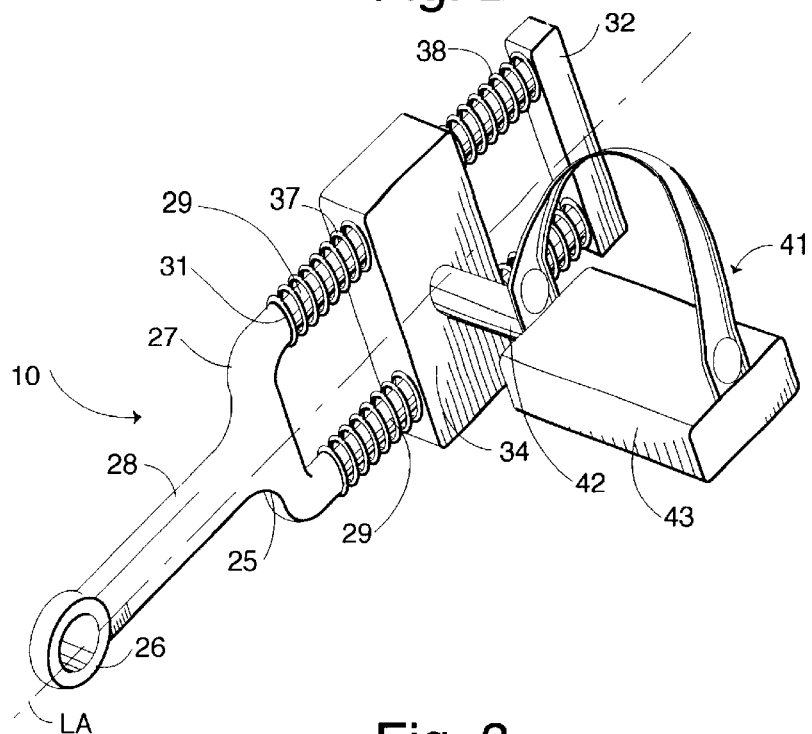
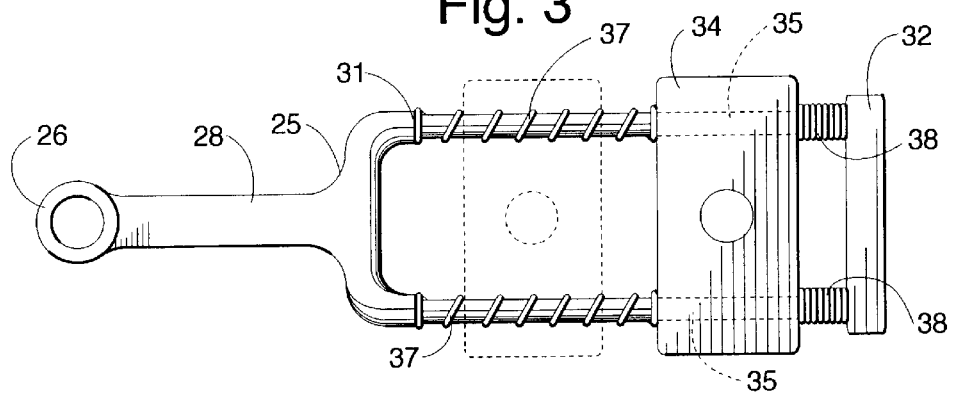
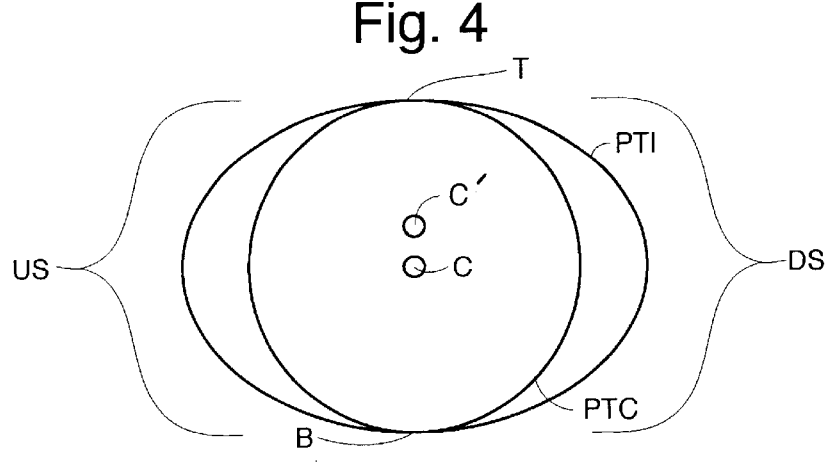

VARIABLE LENGTH CRANK ARM ASSEMBLY

TECHNICAL FIELD

This invention relates generally to cranks for a pedal crank drive for bicycles or the like, and especially to cranks having variable lengths.

BACKGROUND OF THE INVENTION

Bicycles and other pedal driven vehicles typically include a drive assembly which includes a bearing tube mounted to the bicycle frame, a spindle mounted for rotary movement within the bearing tube, a pair a crank arms mounted to the spindle, and a pedal mounted to the end of each crank arm. A first sprocket is coupled to the crank arm which has an endless loop chain mounted thereon which is also coupled to a second sprocket coupled to the rear wheel of the bicycle. The bicycle is manually driven by the rider exerting pressure upon the pedals which cause rotation of the cranks arms, spindle and first sprocket. The movement of the first sprocket causes movement of the chain and second sprocket, which in turn, causes movement of the rear wheel.

It is well known that the length of the crank arm is one factor which controls the amount of force that can be transferred to the first sprocket. Generally, the longer the crank arm is the greater the amount of torque it can transfer from the rider to the first sprocket. However, the anatomy of a human limits the length of a crank arm, as the distance between opposing pedals must allow the rider to reach both pedals at all times during the complete cycling of the pedal. A human's anatomy allows a greater range of leg motion in the forward and rearward, or horizontal, direction than it does in the up and down, or vertical, direction. Therefore, the length of the bicycle crank is limited by the range of leg movement in the vertical direction. However, the greatest leverage is produced by the leg in the downward stroke portion of the pedally cycle. As such, it would be advantageous to have a crank arm extended during this portion of the pedaling cycle.

To this end, others have designed variable length crank arms to enable the crank arm to have a longer length during select portions of the pedaling cycle. U.S. Pat. No. 4,807,491 shows a crank assembly having a telescoping crank arm to vary the length of the arm. The rider manually slides the crank arm to its extended and retracted positions during the pedaling cycle. While this aids in increasing the length of the crank the rider must concentrate on the sliding movement at all times, thereby distracting the rider from other aspects which need attention.

Variable length crank arms have also been designed wherein the crank is mounted to a position offset from the spindle, as shown in U.S. Pat. No. 6,152,471. The offset position of the crank varies the length of the crank arm according to the position of the crank arm within the pedaling cycle, i.e., the crank arm is at its longest length during the downward stroke of the cycle. This type of device however is complicated to manufacture and awkward to control.

Accordingly, it is seen that a need remains for a crank arm assembly that provides an easy to operate variable length crank arm assembly which is also simple to manufacture. It is the provision of such that the present invention is primarily directed.

SUMMARY OF THE INVENTION

In a preferred form of the invention a variable length crank arm assembly for a bicycle having a frame and a rotatable spindle comprises a crank arm coupled to the spindle for rotation about a rotational axis of the spindle. The crank arm has a longitudinal axis, a proximal stop adjacent the spindle and a distal stop distally from said spindle. The crank arm assembly also has a slide mounted upon the crank arm for slideable movement thereon between a proximal location proximal the spindle and a distal location distal the spindle, a pedal rotatably mounted to the slide, a first spring mounted between the slide and the proximal stop to bias the slide toward the distal stop along the crank arm longitudinal axis, and a second spring mounted between the slide and the distal stop to bias the slide toward the proximal stop along the crank arm longitudinal axis. With this construction, an operator may force the slide along the crank arm against the biasing force of the second spring to elongate the stroke of the variable length crank arm and then allow the biasing force of the second spring to return the slide toward the proximal stop, and whereby the operator may force the slide along the crank arm against the biasing force of the first spring to shorten the stroke of the variable length crank arm and then allow the biasing force of the first spring to return the slide toward the distal stop.

BRIEF DESCRIPTION OF THE DRAWING

FIG. 2 is a perspective view of the crank arm assembly of FIG. 1.

FIG. 3 is a side view of the crank arm assembly of FIG. 1.

FIG. 4 is a schematic view of the pedal path of travel for the crank arm assembly of FIG. 1.

DETAILED DESCRIPTION

Figure 1:
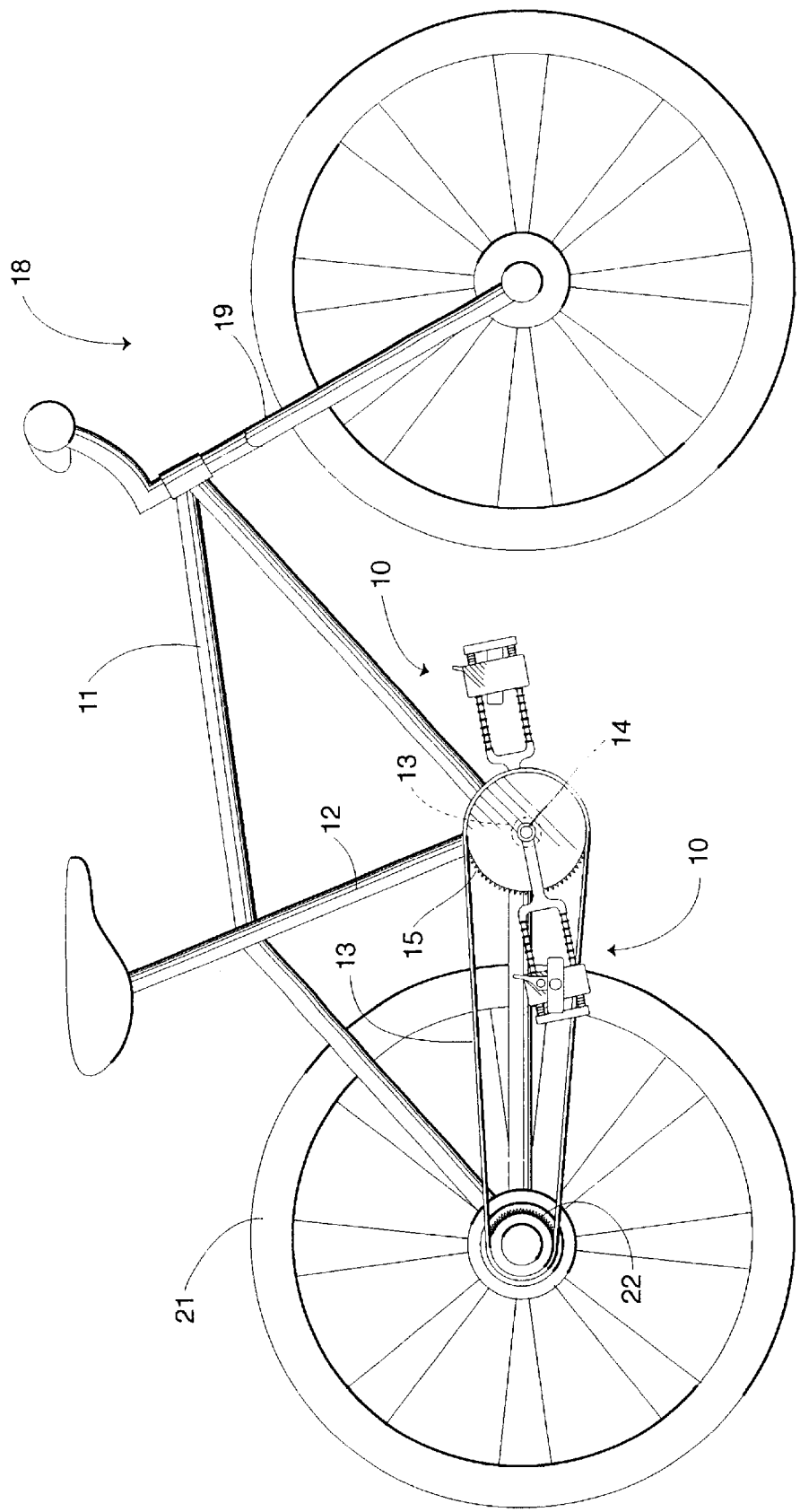
FIG. 1 is a bicycle having a crank arm assembly embodying principles of the invention in a preferred form.

With reference next to the drawings, there is shown a variable length crank arm assembly 10 in a preferred form of the invention. The crank arm assembly 10 is mounted to a bicycle 11 having a frame 12 which includes a bearing tube 13, a sprocket shaft or spindle 14 mounted within the bearing tube 13 for rotational movement through conventional bearings and/or bushings, a front sprocket 15 coupled to the crank arm assembly 10, a front wheel assembly 18 coupled to front forks 19, a rear wheel 21 having a rear sprocket 22, and an endless loop drive chain 23 mounted to rear wheel sprocket 22.

The crank arm assembly 10 has a pair of oppositely disposed crank arms 25 each having a spindle grasping portion or boss 26 from which extends a forked, crank arm member 27 aligned along the longitudinal axis LA. Each crank arm member 27 has a first, single portion 28 that extends to a second, double portion 29. The second portion 29 has a first, proximal stop 31 proximal the joinder of the first and second portions and a second, distal stop or stop plate 32. The crank arm assembly 10 also includes a slide 34 having a pair of channels 35 therethrough sized and shaped to receive the second portion 29 of the arm member 27, i.e., the slide 34 is journaled upon the second portion 29. A pair of first or proximal springs 37 are mounted upon the arm member second portion 29 between the proximal stops 31 and the slide 34 so as to bias the slide 34 toward the distal stop plate 32. A pair of second or distal springs 38 are similarly mounted upon the arm member second portion 29 between the distal stop plate 32 and the slide 34 so as to bias the slide 34 toward the proximal stops 31. The proximal and distal springs 37 and 38 position the slide 34 in a relatively neutral position therebetween which is preferably closer to the distal stop plate 32 than the proximal stops 31.

A pedal assembly 41 is rotatably mounted to the slide 34. The pedal assembly 41 includes a shaft 42 extending from slide 34 and a conventional pedal 43 rotatably mounted to shaft 42.

The crank arm assembly 10 is mounted to the spindle 14 by passing the opposite ends of the spindle 14 through the boss 26 of oppositely disposed crank arm members 27 and locking them in place through nuts 44 threadably mounted to each end of the spindle 14. It should be understood that the entire bicycle may be conventional except for the crank arm assembly 10, and as such a detailed description of such is unnecessary.

In use, the rider revolves the pedal along a path of travel generally depicted in FIG. 4. For illustrative purposes the path commences at the top position T wherein a downward stroke DS commences and continues to bottom position B. The path continues from the bottom position B through an upward stroke US back to the top position T. It should be noted that a comparison of the path of travel of a conventional crank PTC to the present invention's path of travel PTI shows that the present invention's path of travel PTI extends farther from its center point C' than the conventional crank's path of travel PTC does from its conventional center point C. This occurs along virtually all portions of the path except for the portion about the top T. As such, a rider may exert more force along the downward stroke DS and may exert force over a greater distance throughout each pedal stroke, yet the spacing between the pedals along the path of travel PTI may be the same as the conventional path PTC when the pedals are vertically aligned along the top position T and bottom position B. Thus, the limitation of a human's anatomy with regard to the up and down motion of a rider's legs is not overextended by the extended length of the crank arm in the horizontal direction.

As the rider moves forward from the top position T along the downward stroke DS the rider naturally pushes the pedal forward. This forward motion upon the pedal forces the slide 34 outboard toward the distal stop plate 32. As the slide 34 is forced outboard the distal spring 37 is compressed with the slide 34 moved to an extended or distal position the effective length of the crank arm is lengthened, thus enabling the rider to provide maximum leverage upon the spindle 14 through the crank arm assembly 10. In other words, the movement of the slide 34 lengthens the effective length of the crank arm assembly thereby increasing the torque during the most powerful part of the pedaling motion.

As the crank arm continues past the bottom position B, along the upward stroke US, and approaches the top position T the rider forces the pedal forward or inboard, which now forces the slide 34 in a direction towards the proximal stop 31. The compressed distal spring 38 initially aids the rider in this process by biasing the slide 34 inboard towards the proximal stop 31 and back to its neutral position. As the forward movement of the pedal continues, the slide moves inboard past the neutral position and to a proximal or retracted position adjacent the proximal stop 31. The slide 34 reaches its retracted position at approximately the top position T along the path. This movement of the slide 34 compresses the proximal spring 37.

As the path of the pedal passes the top position T the compression force of the proximal spring 37 biases the slide 34 in an outboard direction towards the distal stop plate 32. Thus, as the rider moves the pedal past the top position T the proximal spring 37 aids the rider in moving the slide from its retracted position to its extended position, as previously described.

It thus is seen that the distal spring 38 aids in returning the slide from an extended position towards the proximal stop and the slide's neutral position, while the proximal spring 37 aids in returning the slide from a retracted position towards the distal stop and the slide's neutral position. As such, the rider's effort in moving the pedal is minimized and the concentration level required to accomplish this task reduced.

It should be understood that other types of springs or biasing devices may be used as an alternative, such as pneumatic cylinders or resilient members. Also, the crank may be configured as a single shaft so long as the slide is likewise configured to prevent rotation of the slide along the shaft.

It thus is seen that a crank arm assembly which is simple to manufacture and which is not complicated to operate is now provided which overcomes problems with those of the prior art. While this invention has been described in detail with particular references to the preferred embodiments thereof, it should be understood that many modifications, additions and deletions, in addition to those expressly recited, may be made thereto without departure from the spirit and scope of the invention as set forth in the following claims.

What is claimed is:

1. A variable length crank arm assembly for a bicycle having a frame and a rotatable spindle, the crank arm assembly comprising, a crank arm coupled to the spindle for rotation about the spindle, the crank arm having a longitudinal axis, the crank arm having a proximal stop adjacent the spindle and a distal stop distally from said spindle;

a slide mounted upon said crank arm for slideable movement thereon between a proximal location proximal the spindle and a distal location distal the spindle;

a pedal rotatably mounted to said slide;

a first spring mounted between said slide and said proximal stop to bias said slide toward said distal stop along said crank arm longitudinal axis; and a second spring mounted between said slide and said distal stop to bias said slide toward said proximal stop along said crank arm longitudinal axis, whereby an operator may force the slide along the crank arm against the biasing force of the second spring to elongate a stroke of the variable length crank arm and then allow the biasing force of the second spring to return the slide toward the proximal stop, and whereby the operator may force the slide along the crank arm against the biasing force of the first spring to shorten the stroke of the variable length crank arm and then allow the biasing force of the first spring to return the slide toward the distal stop.

2. The variable length crank arm assembly of claim 1 wherein said crank arm has two generally parallel members and said slide has two channels sized and shaped to receive said members.

3. A variable length crank arm assembly for a bicycle having a frame and a rotatable spindle, the crank arm assembly comprising, a crank arm coupled to the spindle for rotation about a rotational axis of the spindle, the crank arm having a proximal end adjacent the spindle and a distal end distal the spindle;

a slide mounted upon said crank arm for slideable movement thereon between a-proximal location proximal the proximal end and a distal location adjacent the distal end;

a pedal rotatably mounted to said slide;

a first spring positioned to bias said slide along said crank arm longitudinal axis toward said distal end; and a second spring positioned to bias said slide along said crank arm longitudinal axis toward said proximal end, whereby an operator may force the slide along the crank arm against the biasing force of the second spring to elongate a stroke of the variable length crank arm and then allow the biasing force of the second spring to return the slide toward the proximal stop, and whereby the operator may force the slide along the crank arm against the biasing force of the first spring to shorten the stroke of the variable length crank arm and then allow the biasing force of the first spring to return the slide toward the distal stop.

4. The variable length crank arm assembly of claim 3, wherein said crank arm has two generally parallel members and said slide has two channels sized and shaped to receive said members.

5. A variable length crank arm assembly for a bicycle having a frame and a rotatable spindle, the crank arm assembly comprising, a crank arm coupled to the spindle for rotation about a rotational axis of the spindle, the crank arm having a proximal end adjacent the spindle and a distal end distal the spindle;

a slide mounted upon said crank arm for slideable movement thereon between a proximal location proximal the proximal end and a distal location adjacent the distal end;

a pedal rotatably mounted to said slide;

a first biasing means positioned to bias said slide along said crank arm longitudinal axis toward said distal end; and a second biasing means positioned to bias said slide along said crank arm longitudinal axis toward said proximal end, whereby an operator may force the slide along the crank arm against the biasing force of the second biasing means to elongate a stroke of the variable length crank arm and then allow the biasing force of the second biasing means to return the slide toward the proximal stop, and whereby the operator may force the slide along the crank arm against the biasing force of the first biasing means to shorten the stroke of the variable length crank arm and then allow the biasing force of the first biasing means to return the slide toward the distal stop.

6. The variable length crank arm assembly of claim 5 wherein said crank arm has two generally parallel members and said slide has two channels sized and shaped to receive said members.

\* \* \* \* \*